3,313,682
PROCESS FOR COMBATTING MICROORGANISMS WITH N - ALKYLATED 1,3 - DIHYDROXY - 2-LOWER-ALKYL-2-PROPYLAMINES
Bernard L. Zenitz, Colonie, N.Y., assignor to Sterling Drug Inc., New York, N.Y., a corporation of Delaware
No Drawing. Filed Oct. 19, 1964, Ser. No. 404,929
13 Claims. (Cl. 167—22)

This application is a continuation-in-part of my co-pending application Ser. No. 732,436, filed May 2, 1958, now abandoned.

This invention relates to a process for using compositions of matter classified in the art of chemistry as hydroxylated N-alkylamines.

The invention sought to be patented, in its process aspect, is described as residing in the concept of applying to a medium, in order to obviate objectionable or deleterious microorganisms, a composition of matter containing a chemical compound having a molecular structure in which there is attached, to the nitrogen atom of a 1,3-dihydroxy-2-lower-alkyl-2-propylamine, at least one alkyl group, said compound having a total of between twelve and twenty-four carbon atoms, inclusive. By the term "objectionable or deleterious" is meant those organisms which are undesired in any particular environment for any reason whatsoever.

The hydroxylated secondary and tertiary amines useful in practicing my invention are represented by the following structural formula:

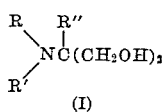

(I)

wherein R represents a hydrogen atom or an alkyl radical, R' represents an alkyl radical, R" represents a lower-alkyl radical, and the sum of the number of carbon atoms in R, R', and R" is between nine and twenty-one, inclusive.

The exact nature of the alkyl radicals represented by R, R', and R" is not critical, the only critical feature being the total carbon content of the molecule. Thus when R or R' are alkyl radicals they can be any of such straight chained or branch chained groups as methyl, ethyl, propyl, isopropyl, butyl, isobutyl, secondary-butyl, tertiary-butyl, pentyl, isopentyl, hexyl, isohexyl, heptyl, octyl, isooctyl, nonyl, decyl, undecyl, dodecyl, tridecyl, tetradecyl, hexadecyl, octadecyl, and the like. R", in representing a lower-alkyl radical, preferably has from one to about six carbon atoms, and thus can be any of such radicals as methyl, ethyl, propyl, isopropyl, butyl, isobutyl, pentyl, hexyl, and the like. A particularly preferred class of compounds are those in which R" represents the methyl or ethyl radicals.

The manner and process of making and using the invention will now be generally described, so as to enable a person skilled in the art of chemistry to make and use the same, as follows:

The aforesaid compounds of Formula I where R is hydrogen can be prepared by direct alkylation of a 1,3-dihydroxy-2-lower-alkyl-2-propylamine,

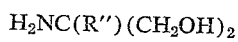

The latter is heated with an alkyl ester, RX or R'X, where X is the anion of a strong acid, in the presence of an acid-acceptor. The anion, X, is one derived from a strong mineral acid, including such anions as chloride, bromide, iodide, nitrate, sulfate, phosphate, and the like, or strong organic acids, including such anions as methanesulfonate, benzenesulfonate, and the like. The halides are preferred anions.

The acid-acceptor can be any basic substance which will neutralize the acid, HX, that is split out during the course of the reaction, and which will not otherwise interfere with the reaction. Inorganic bases, such as the alkali and alkaline earth metal hydroxides, carbonates and bicarbonates can be used. Preferred acid-acceptors are the alkali metal carbonates, viz. sodium carbonate or potassium carbonate.

A preferred method of preparing the secondary amines, R'NHC(R")(CH₂OH)₂, comprises reacting a 1,3-dihydroxy-2-lower-alkyl-2-propylamine with between about one-third and one-half molar equivalent of alkyl ester, R'X. In this instance the excess starting amine acts as the acid-acceptor.

A method for preparing the tertiary amines of Formula I (R is alkyl) comprises reacting the secondary amines, R'NHC(R")(CH₂OH)₂, with the same or a different alkyl ester, RX, under the same conditions described above to give the tertiary amines,

where R and R' are the same or different alkyl.

Although the reaction can be conducted in the absence of a diluent, it is preferred to employ suitable chemically inert solvents, for example, lower-alkanols, as reaction media. Appreciable quantities of water are to be avoided in order to prevent hydrolysis of the alkyl ester. The reaction mixture is heated at a temperature between about 50° and 200° C., conveniently at the reflux temperature of the inert solvent.

The compounds used in the practice of the instant invention are the bases of Formula I and the acid-addition salts of said bases, and said acid-addition salts are considered to be the full equivalents of the free bases. The compounds of Formula I in the free base form are converted to the acid-addition salt form by interaction of the base with an acid. In like manner the free bases can be regenerated from the acid-addition salt form in the conventional manner, that is, by treating the salts with strong aqueous bases, for example alkali metal hydroxides, alkali metal carbonates, and alkali metal bicarbonates. The bases thus regenerated can then be interacted with the same or a different acid to give back the same or a different acid-addition salt. Thus the bases and all of their acid-addition salts are readily interconvertible.

It will thus be appreciated that Formula I not only represents the structural configuration of the bases useful in the practice of my invention but is also representative of structural entity which is common to all of the compounds, whether in the form of the free bases or in the form of the acid-addition salts of the bases. I have found that by virtue of this common structural entity, the bases and their acid-addition salts have inherent microbiological activity of a type to be more fully described hereinbelow.

Although water-insolubility or lack of crystalline character may make some particular salt species unsuitable or less desirable for use as such in a given application, such salts can be converted to the corresponding bases by decomposition of the salt with aqueous base as described above, or alternatively they can be converted to any desirable acid-addition salt by double decomposition reactions involving the anion, for example by ion-exchange procedures.

Moreover, apart from their usefulness in microbiological applications, the salts are useful as characterizing or identifying derivatives of the free bases or in isolation or purification procedures. Like all of the acid-addition salts, such characterizing or purification salt derivatives can, if desired, be used to regenerate the free bases by reaction of the salts with aqueous base, or alternatively can be converted to any desired acid-addition salt by, for example, ion-exchange procedures.

It will be appreciated from the foregoing that all of the acid-addition salts of the bases are useful and valuable compounds, regardless of considerations of solubility, physical form, and the like, and are accordingly within the purview of the instant invention.

The novel feature of the invention, then, resides in the concept of using both the bases and cationic forms thereof and not in any particular acid or acid anion associated with the salt forms of the compounds; rather, the acid anions which can be associated in the salt forms are in themselves neither novel nor critical and therefore can be any acid anion or acid-like substance capable of salt formation with bases. In fact in aqueous solutions, the base form or water-soluble acid addition salt form of the compounds both possess a common protonated cation or ammonium ion.

Thus the acid-addition salts discussed above are prepared from any organic acid, inorganic acid (including organic acids having an inorganic group therein), or organo-metallic acid, organo mono- and polysulfonic and -sulfinic acids, organic phosphonic and phosphinic acids, organic acids of arsenic and antimony, organic heterocyclic carboxylic, sulfonic, and sulfinic acids, acidic ion-exchange resins, and inorganic acids of any acid forming element or combination of elements. In addition, other salt-forming compounds which are acidic in their chemical properties but which are not generally considered as acids in the same sense as carboxylic or sulfonic acids are also considered to be among the numerous acids which can be used to prepare acid-addition salts of the compounds of the invention. Thus there is also comprehended acidic phenolic compounds and acidic compounds having "activated" or acidic hydrogen atoms, as for example, picrolonic acid, or barbituric acid derivatives having an acidic proton. Also comprehended as salt forming agents are so-called Lewis acids which lack a pair of electrons in the outer electron shell and react with basic compounds having an unshared pair of electrons to form salts, for example boron trifluoride.

Thus appropriate acid-addition salts are those derived from such diverse acids as formic acid, acetic acid, isobutyric acid, alpha-mercaptopropionic acid, malic acid, fumaric acid, succinic acid, succinamic acid, tartaric acid, citric acid, lactic acid, benzoic acid, 4-methoxybenzoic acid, phthalic acid, anthranilic acid, 1-naphthalenecarboxylic acid, cinnamic acid, cyclohexanecarboxylic acid, mandelic acid, tropic acid, crotonic acid, acetylene dicarboxylic acid, sorbic acid, 2-furancarboxylic acid, cholic acid, pyrenecarboxylic acid, 2-pyridinecarboxylic acid, 3-indoleacetic acid, quinic acid, sulfamic acid, methanesulfonic acid, isethionic acid, benzenesulfonic acid, p-toluenesulfonic acid, p-aminophenylarsinic acid, phenylstibnic acid, phenylphosphinous acid, methylphosphonic acid, phenylphosphinic acid, polymeric anionic ion-exchange resin, hydrofluoric acid, hydrochloric acid, hydrobromic acid, hydriodic acid, perchloric acid, nitric acid, sulfuric acid, phosphoric acid, hydrocyanic acid, phosphotungstic acid, molybdic acid, phosphomolybdic pyrophosphoric acid, arsenic acid, picric acid, picrolonic acid, barbituric acid, boron trifluoride, and the like.

The acid-addition salts are prepared either by dissolving the free base in an aqueous solution containing the appropriate acid and isolating the salt by evaporating the solution, or by reacting the free base and acid in an organic solvent, in which case the salt separates directly or can be obtained by concentration of the solution.

The structures of the compounds used in the practice of the invention are established by the mode of synthesis and corroborated by the correspondence between calculated values for the elements and values found by chemical analysis.

The following examples will further illustrate the invention without being limited thereto.

EXAMPLE 1

*N-(n-dodecyl)-1,3-dihydroxy-2-methyl-2-propylamine*

[I: R is H; R' is $CH_3(CH_2)_{11}$; R'' is $CH_3$]

A mixture of 52.26 g. (0.20 mole) of n-dodecyl bromide and 52.5 g. (0.50 mole) of 1,3-dihydroxy-2-methyl-2-propylamine in 500 ml. of n-butanol was refluxed for seventy-two hours. The reaction mixture was concentrated in vacuo, the residual oil was poured into two liters of cold water, and the solid which separated was collected, dried, and recrystallized once from ethanol and twice from acetone to give 24.75 g. of N-(n-dodecyl)-1,3-dihydroxy-2-methyl-2-propylamine, M.P. 50.8–53.6° C. (corr.).

EXAMPLE 2

*N-(n-dodecyl)-N-methyl-1,3-dihydroxy-2-ethyl-2-propylamine*

[I: R is CH; R' is $CH_3(CH_2)_{11}$; R'' is $C_2H_5$]

A mixture of 34.8 g. (0.125 mole) of N-(n-dodecyl)-1,3-dihydroxy-2-ethyl-2-propylamine, 21.3 g. (0.15 mole) of methyl iodide, and 25.0 g. (0.25 mole) of potassium bicarbonate in 75 ml. of absolute ethanol was heated under reflux for twenty-four hours. The insoluble inorganic material was removed by filtration, the filtrate was taken to dryness, and the residual oil was distilled in vacuo, the fraction boiling at 147–152° C./0.0025 mm. being collected as product. There was thus obtained 21.4 g. of N - (n-dodecyl)-N-methyl-1,3-dihydroxy-2-ethyl-2-propylamine, $n_D^{25}=1.4686$.

EXAMPLES 3–38

The following compounds of Formula I listed below in Table 1 can be prepared from an appropriate alkyl halide and 1,3-dihydroxy-2-lower-alkyl-2-propylamine (to prepare the secondary amines where R is H) using the manipulative procedure described above in Example 1. The tertiary amines where R and R' are alkyl can be prepared either from an appropriate alkyl halide and N-alkyl-1,3 - dihydroxy - 2-lower-alkyl-2-propylamine using the manipulative procedure described above in Example 2 or by other procedures well-known to those skilled in the art of chemistry. All melting points are corrected.

TABLE 1

| Example | R | R' | R'' | M.P. (or B.P.) | Cryst. from |
|---|---|---|---|---|---|
| 3 | H | $CH_3(CH_2)_7$ | $CH_3$ | 119–128° C./0.12 mm $n_D^{25}=1.4682$ | |
| 4 | H | $CH_3(CH_2)_7$ | $C_2H_5$ | 110–123° C./0.0001 mm $n_D^{25}=1.4668$ | |
| 5 | H | $CH_3(CH_2)_9$ | $CH_3$ | 45.6–48.2° C | Acetone. |
| 6 | H | $CH_3(CH_2)_9$ | $C_2H_5$ | 135–144.5° C./0.0005 mm $n_D^{25}=1.4692$ | |
| 7 | H | $CH_3(CH_2)_{11}$ | $C_2H_5$ | 32.4–33.2° C | Do. |
| 8 | H | $CH_3(CH_2)_{13}$ | $CH_3$ | 55.4–57.6° C | Do. |
| 9 | H | $CH_3(CH_2)_{13}$ | $C_2H_5$ | 42.6–43.8° C | Do. |
| 10 | H | $CH_3(CH_2)_{15}$ | $CH_3$ | 62.2–64.4° C | Ethanol. |
| 11 | H | $CH_3(CH_2)_{15}$ | $C_2H_5$ | 48.8–50.0° C | Acetone. |
| 12 | H | $CH_3(CH_2)_{17}$ | $CH_3$ | 67.7–70.1° C | Methanol-acetone. |
| 13 | $C_2H_5$ | $CH_3(CH_2)_{11}$ | $CH_3$ | 134° C./0.0001 mm 82.6–85.6° C.[1] | |
| 14 | $C_2H_5$ | $CH_3(CH_2)_9$ | $CH_3$ | 82.4–84.0° C.[1] 30.3–32.7° C | Acetone. |
| 15 | $C_2H_5$ | $CH_3(CH_2)_{13}$ | $CH_3$ | 86.4–89.0° C.[1] 76.8–82.0° C.[2] | Ethyl acetate. |
| 16 | $C_2H_5$ | $CH_3(CH_2)_{15}$ | $CH_3$ | 79.0–82.6° C.[3] | Do. |
| 17 | $C_2H_5$ | $CH_3(CH_2)_{17}$ | $CH_3$ | 40.0–41.8° C | Do. |
| 18 | $CH_3$ | $CH_3(CH_2)_{11}$ | $CH_3$ | 46.4–49.0° C | Methanol. |
| 19 | $CH_3(CH_2)_2$ | $CH_3(CH_2)_9$ | $C_2H_5$ | 56.6–58.8° C 125–137° C./0.005 mm $n_D^{25}=1.4680$ | |
| 20 | $CH_3(CH_2)_3$ | $CH_3(CH_2)_9$ | $C_2H_5$ | 124–130° C./0.0002 mm $n_D^{25}=1.4678$ 95.6–99.0° C.[1] | |
| 21 | $CH_3(CH_2)_4$ | $CH_3(CH_2)_9$ | $C_2H_5$ | 130–133° C./0.003 mm $n_D^{25}=1.4661$ 75.4–77.8° C.[1] | Acetone-ether. |
| 22 | $CH_3(CH_2)_2$ | $CH_3(CH_2)_{11}$ | $CH_3$ | 146–8° C./0.0005 mm $n_D^{25}=1.4660$ | |
| 23 | $CH_3(CH_2)_3$ | $CH_3(CH_2)_{11}$ | $CH_3$ | 149–160° C./0.0006 mm $n_D^{25}=1.4658$ | |
| 24 | $CH_3(CH_2)_2$ | $CH_3(CH_2)_{11}$ | $C_2H_5$ | 140–154° C./0.0015 mm $n_D^{25}=1.4679$ | |
| 25 | $CH_3(CH_2)_3$ | $CH_3(CH_2)_{11}$ | $C_2H_5$ | 152–157° C./0.0002 mm $n_D^{25}=1.4680$ | |
| 26 | $CH_3$ | $CH_3(CH_2)_{13}$ | $CH_3$ | 159.8–161.2° C | Methanol. |
| 27 | $CH_3(CH_2)_2$ | $CH_3(CH_2)_{13}$ | $CH_3$ | 135–142° C./0.0002 mm $n_D^{25}=1.4667$ | |
| 28 | $CH_3(CH_2)_3$ | $CH_3(CH_2)_{13}$ | $CH_3$ | 150–155° C./0.0003 mm $n_D^{25}=1.4662$ | |
| 29 | $CH_3$ | $CH_3(CH_2)_{13}$ | $C_2H_5$ | 51.8–53.8° C | Acetone. |
| 30 | $C_2H_5$ | $CH_3(CH_2)_{13}$ | $C_2H_5$ | 160–166° C./0.002 mm $n_D^{25}=1.4690$ | |
| 31 | $CH_3(CH_2)_2$ | $CH_3(CH_2)_{13}$ | $C_2H_5$ | 145–152° C./0.0005 mm $n_D^{25}=1.4682$ | |
| 32 | $CH_3(CH_2)_3$ | $CH_3(CH_2)_{13}$ | $C_2H_5$ | 133–7° C./0.0003 mm $n_D^{25}=1.4675$ | |
| 33 | $CH_3$ | $CH_3(CH_2)_{15}$ | $CH_3$ | 58.2–60.2° C | Do. |
| 34 | $C_2H_5$ | $CH_3(CH_2)_{11}$ | $C_2H_5$ | 145–152° C./0.0012 mm $n_D^{25}=1.4679$ | |
| 35 | $CH_3$ | $CH_3(CH_2)_{17}$ | $CH_3$ | 67.0–68.0° C | Ethyl acetate. |
| 36 | $CH_3(CH_2)_5$ | $CH_3(CH_2)_9$ | $CH_3$ | 133° C./0.0002 mm | |
| 37 | $(CH_3CH_2CH_2)_2CH$ | $(CH_3CH_2CH_2)_2CH$ | $CH_3$ | 120–125° C./0.1 mm $n_D^{25}=1.4739$ 137.5–137.8° C.[1] | Methanol-acetone-ether. |
| 38 | $CH_3(CH_2)_7$ | $CH_3(CH_2)_7$ | $CH_3$ | 139° C./0.0003 mm $n_D^{25}=1.4651$ | |

[1] Hydrochloride salt.
[2] Mucate salt.
[3] Cyclohexylsulfamate salt.

The compounds are formulated for use by preparing a dilute solution in an aqueous acidic medium or in a neutral solution containing a surfactant, or alternatively in an organic medium in which the compounds are soluble, for example ethyl alcohol, terpineol, and the like, and are applied to a surface to be disinfected, or which is susceptible to contamination, by conventional means such as spraying, swabbing, immersion, and the like. Alternatively the compounds can be formulated as ointments or creams by incorporating them in conventional ointment or cream bases, as alkylpolyether alcohols, cetyl alcohol, stearyl alcohol, and the like, or as jellies by incorporating them in conventional jelly bases as glycerin and tragacanth. They can also be formulated for use as aerosol sprays or foams.

The undesired microorganisms against which the instant compounds are effective may be pathogenic or not but whose presence is unwanted and includes bacteria, fungi, protozoa, algae, spermatozoa, and various other forms of microorganisms well known to microbiology.

Bactericidal activity was determined in vitro by measuring the minimal concentration necessary to kill the bacteria in ten minutes, and it was found that the compounds were effective in dilutions ranging from around 1:1000 to 1:400,000. They were effective either in acid solution, such as aqueous acetic, propionic, quinic or phthalic acids, or when dispersed, as the free bases in neutral aqueous medium by means of a surface active agent. The compounds of Formula I having the designated carbon content have been found to possess microbiocidal activity against such diverse organisms as, for example, Staphylococcus aureus, Eberthella typhi, Pseudomonas aeruginosa, Clostridium welchii, Mycobacterium tuberculosis, Aspergilla niger, Trichophyton mentagrophytes, and Monilia albicans.

The minimal bactericidal concentrations of representative compounds of the invention as determined by serial dilution tests against various bacterial organisms are given below in Table 2. The example numbers refer to the examples above wherein the preparations of the compounds are described.

TABLE 2

| Ex. | Organisms | | | | |
|---|---|---|---|---|---|
| | St. aureus | E. typhi | Ps. aeruginosa | Cl. welchii | Myco. tuberc. |
| 1 | 1:2,400 | 1:1,260 | | 1:20,000 | |
| 2 | 1:40,000 | 1:13,000 | 1:1,300 | | |
| 3 | 1:2,000 | 1:1,000 | | 1:2,000 | |
| 5 | 1:4,000 | 1:4,000 | | 1:10,000 | 1:130,000 |
| 8 | 1:21,420 | 1:8,880 | | | |
| 12 | 1:920 | | | | |
| 13 | 1:7,200 | 1:10,700 | | | |
| 14 | 1:4,000 | 1:4,000 | | 1:1,300 | |
| 15 | 1:11,700 | 1:6,800 | | | |
| 16 | 1:4,000 | 1:1,800 | | | |
| 17 | 1:1,380 | 1:240 | | | |
| 18 | 1:40,000 | 1:13,000 | | 1:20,000 | |
| 19 | 1:13,000 | 1:4,000 | | 1:20,000 | |
| 20 | 1:20,000 | 1:4,000 | | 1:40,000 | |
| 23 | 1:130,000 | 1:20,000 | 1:1,000 | 1:100,000 | |
| 24 | 1:100,000 | 1:1,300 | | 1:100,000 | |
| 25 | 1:200,000 | 1:1,000 | | 1:130,000 | |
| 27 | 1:130,000 | 1:2,000 | | 1:200,000 | |
| 28 | 1:400,000 | 1:1,000 | | 1:100,000 | |
| 29 | 1:100,000 | 1:20,000 | 1:1,300 | 1:400,000 | |
| 30 | 1:200,000 | 1:20,000 | 1:1,000 | 1:200,000 | |
| 31 | 1:40,000 | 1:1,000 | | 1:130,000 | |
| 32 | 1:40,000 | | | 1:100,000 | |
| 33 | 1:40,000 | 1:10,000 | 1:1,000 | 1:100,000 | |
| 34 | 1:40,000 | 1:20,000 | 1:1,000 | 1:200,000 | |
| 36 | 1:1,860 | 1:2,240 | | | |
| 37 | 1:2,000 | | | | |
| 38 | 1:14,400 | 1:3,200 | | | |

Minimal fungicidal concentrations of representative compounds of the invention as determined by fourteen day survival tests at various concentrations of the test compounds are given below in Table 3. The numbers refer to the examples above wherein the preparations of the compounds are described.

TABLE 3

| Example | T. mentagrophytes | As. niger | M. albicans |
|---|---|---|---|
| 1 | 1:10,000 | 1:10,000 | 1:1,000 |
| 2 | 1:100,000 | 1:10,000 | 1:10,000 |
| 5 | 1:1,000 | 1:1,000 | 1:1,000 |
| 8 | 1:100,000 | 1:10,000 | 1:10,000 |
| 10 | 1:10,000 | 1:10,000 | 1:10,000 |
| 12 | 1:10,000 | 1:1,000 | 1:1,000 |
| 13 | 1:100,000 | 1:10,000 | 1:10,000 |
| 14 | 1:10,000 | 1:1,000 | 1:1,000 |
| 16 | 1:100,000 | 1:10,000 | 1:10,000 |
| 17 | 1:10,000 | 1:10,000 | 1:10,000 |
| 19 | 1:10,000 | 1:1,000 | 1:1,000 |
| 20 | 1:10,000 | 1:1,000 | 1:10,000 |
| 23 | 1:100,000 | 1:10,000 | 1:10,000 |
| 24 | 1:100,000 | 1:1,000 | 1:10,000 |
| 25 | 1:100,000 | 1:10,000 | 1:10,000 |
| 26 | 1:100,000 | 1:1,000 | 1:1,000 |
| 29 | 1:100,000 | 1:10,000 | 1:10,000 |
| 31 | 1:100,000 | 1:10,000 | 1:10,000 |
| 32 | 1:100,000 | 1:1,000 | 1:10,000 |
| 34 | 1:100,000 | 1:10,000 | 1:10,000 |
| 36 | 1:1,000 | 1:1,000 | 1:1,000 |
| 38 | 1:10,000 | 1:10,000 | 1:10,000 |

The spermatocidal activities of the compounds were determined using the standard Brown and Gamble dilution test, the compounds being considered active if they immobilize spermatozoa in two minutes or less at a dilution of at least 1:1000. Results thus obtained for representative compounds are given below in Table 4, the data being expressed in terms of minimum effective spermicidal dilutions.

TABLE 4

| Example | Activity | | |
|---|---|---|---|
| | Source A | Source B | Source C |
| 1 | | 1:8,000 | |
| 2 | | 1:4,000 | |
| 4 | | 1:1,000 | |
| 5 | | 1:2,000 | |
| 6 | | 1:1,000 | |
| 7 | 1:8,000 | 1:4,000 | 1:4,000 |
| 8 | 1:20,000 | 1:4,000 | |
| 10 | | 1:2,000 | |
| 13 | | 1:2,000 | |
| 14 | | 1:4,000 | |
| 15 | | 1:2,000 | |
| 16 | | 1:1,000 | |
| 17 | | 1:4,000 | |
| 18 | | 1:4,000 | |
| 19 | | 1:3,000 | |
| 20 | | 1:20,000 | 1:6,000 |
| 22 | | 1:6,000 | 1:6,000 |
| 23 | | 1:8,000 | 1:6,000 |
| | | 1:20,000 | |
| 24 | | 1:4,000 | 1:6,000 |
| 25 | 1:4,000 | 1:10,000 | |
| 26 | | 1:8,000 | |
| 27 | | 1:4,000 | |
| 28 | | 1:8,000 | |
| 29 | 1:4,000 | 1:8,000 | |
| 30 | | 1:4,000 | |
| 31 | | 1:2,000 | |
| 32 | | 1:1,000 | |
| 33 | 1:6,000 | 1:1,800 | |
| 34 | | 1:4,000 | |
| 38 | | 1:12,000 | 1:10,000 |

Practical applications of the formulations include use as sterilants for floor scrubs, public accommodation furnishings, food utensils, surgical devices, and in topical uses generally, as well as an active anti-microbial component of self-sterilizing compositions and as spermatocidal agents.

The subject matter which I regard as my invention is particularly pointed out and distinctly claimed as follows:

1. A process which comprises applying to a medium, in order to obviate undesired microorganisms in or on said medium, an effective concentration of a composition containing N - alkylated - 1,3-dihydroxy-2-lower-alkyl-2-propylamine wherein the total number of carbon atoms in the compound is between twelve and twenty-four, inclusive.

2. A process which comprises applying to a medium, in order to obviate undesired microorganisms in or on said medium, an effective concentration of a composition containing a compound of the formula:

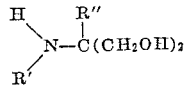

where R' represents alkyl, R'' represents lower-alkyl, and the sum of the number of carbon atoms in R' and R'' is between nine and twenty-one, inclusive.

3. A process which comprises applying to a medium, in order to obviate undesired microorganisms in or on said medium, an effective concentration of a composition containing a compound of the formula:

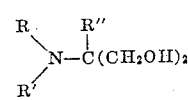

wherein R and R' represent alkyl, R'' represents lower-alkyl, and the sum of the number of carbon atoms in R, R', and R'' is between nine and twenty-one, inclusive.

4. A process which comprises applying to a medium, in order to obviate undesired microorganisms in or on said medium, an effective concentration of a composition containing N-(n-decyl)-1,3-dihydroxy-2-methyl-2-propylamine.

5. A process which comprises applying to a medium, in order to obviate undesired microorganisms in or on said medium, an effective concentration of a composition containing N-(n-dodecyl)-N-(n-butyl)-1,3-dihydroxy-2-methyl-2-propylamine.

6. A process which comprises applying to a medium, in order to obviate undesired microorganisms in or on said medium, an effective concentration of a composition containing N-(n-dodecyl)-N-(n-propyl)-1,3-dihydroxy-2-ethyl-2-propylamine.

7. A process which comprises applying to a medium, in order to obviate undesired microorganisms in or on said medium, an effective concentration of a composition containing N-(n-tetradecyl)-N-(n-propyl)-1,3-dihydroxy-2-methyl-2-propylamine.

8. A process which comprises applying to a medium, in order to obviate undesired microorganisms in or on said medium, an effective concentration of a composition containing N-(n-tetradecyl)-N-(n-butyl)-1,3-dihydroxy-2-methyl-2-propylamine.

9. A process which comprises applying to a medium, in order to obviate undesired microorganisms in or on said medium, an effective concentration of a composition containing N-(n-tetradecyl)-N-methyl-1,3-dihydroxy-2-methyl-2-propylamine.

10. A process which comprises applying to a medium, in order to obviate undesired microorganisms in or on said medium, an effective concentration of a composition containing N-(n-tetradecyl)-N-ethyl-1,3-dihydroxy-2-ethyl-2-propylamine.

11. A process which comprises applying to a medium, in order to obviate undesired microorganisms in or on said medium, an effective concentration of a composition containing N-(n-tetradecyl)-N-(n-propyl)-1,3-dihydroxy-2-ethyl-2-propylamine.

12. A process which comprises applying to a medium, in order to obviate undesired microorganisms in or on said medium, an effective concentration of a composition containing N-(n-tetradecyl)-N-(n-butyl)-1,3-dihydroxy-2-ethyl-2-propylamine.

13. A process which comprises applying to a medium, in order to obviate undesired microorganisms in or on said medium, an effective concentration of a composition containing N-(n-hexadecyl)-N-methyl-1,3-dihydroxy-2-methyl-2-propylamine.

No references cited.

ALBERT T. MEYERS, *Primary Examiner.*

VERA C. CLARKE, *Assistant Examiner.*

UNITED STATES PATENT OFFICE
CERTIFICATE OF CORRECTION

Patent No. 3,313,682                                     April 11, 1967

Bernard L. Zenitz

It is hereby certified that error appears in the above numbered patent requiring correction and that the said Letters Patent should read as corrected below.

Column 3, line 15, for "desirable" read -- desired --; column 4, line 49, for the left-hand portion of the formula reading $CH$ read $CH_3$ column 7, TABLE 2, second column, line 10 thereof, for "1:4,000" read -- 1:4,400 --; same TABLE 2, fifth column, line 26 thereof, for "1:200,000" read -- 1:20,000 --.

Signed and sealed this 16th day of July 1968.

(SEAL)
Attest:

Edward M. Fletcher, Jr.
Attesting Officer

EDWARD J. BRENNER
Commissioner of Patents